United States Patent [19]

Russell

[11] Patent Number: 5,153,473

[45] Date of Patent: Oct. 6, 1992

[54] ECCENTRIC-ROTOR ELECTROMAGNETIC ENERGY CONVERTER

[76] Inventor: Camille C. Russell, 172 W. Elfini Green, Port Hueneme, Calif. 93041

[21] Appl. No.: 711,970

[22] Filed: Jun. 7, 1991

[51] Int. Cl.⁵ .......................... H02K 7/06; H02P 1/00
[52] U.S. Cl. ...................................... 310/81; 310/51; 318/114
[58] Field of Search .......................... 310/51, 81, 268; 318/114, 128; 340/407; 434/113

[56] References Cited

U.S. PATENT DOCUMENTS

| 4,728,837 | 3/1988 | Bhadra | 310/81 |
| 4,864,276 | 9/1989 | Tribbey et al. | 340/407 |
| 5,036,239 | 7/1991 | Yamaguchi | 310/81 |

FOREIGN PATENT DOCUMENTS

| 2-211037 | 8/1970 | Japan | 310/81 |
| 984075 | 12/1982 | U.S.S.R. | 310/81 |

Primary Examiner—Steven L. Stephan
Assistant Examiner—Matthew Nguyen
Attorney, Agent, or Firm—Roger A. Marrs

[57] ABSTRACT

A converter has a body housing a rotatable shaft constituting a drive on which an eccentric weight such as a ferrous metal ball is carried. An end is connected at one end to the shaft while its opposite arm supports the weight in fixed relationship to the shaft so that the weight travels concentrically as the shaft turns. Bearings rotatably mount the ends of the shaft to the housing body cavity defined by outer sidewalls supporting at least four spaced-apart electromagnets. The electromagnets are spaced radially about the drive shaft so as to permit the arm and weight to rotate about the turning axis in response to electrical energization of the electromagnets in a predetermined sequence. The magnetic flux pulls and pushes the weight along its circular travel path.

1 Claim, 1 Drawing Sheet

ECCENTRIC-ROTOR ELECTROMAGNETIC ENERGY CONVERTER

BACKGROUND OF THE INVENTION

1. Field of the Invention

The present invention relates to the field of energy conversion systems, and more particularly to a novel electromagnetic converter for translating electromagnetic energy into mechanical energy output which is useful and productive.

2. Brief Description of the Prior Art

In the past, the principal source of electrical energy for all industry resided in the use of a generator comprising a device for changing mechanical energy of motion into electrical energy. This energy conversion takes place by the action of magnetic forces and is termed electromagnetic. However, this energy-conversion process that is used in generators is a reversible process; that is, the same equipment can change electrical energy to mechanical motion or movement. Although prior energy converters, termed "dynamos", have been used for converting electrical energy into mechanical energy, problems and difficulties have been encountered which stem largely from the fact that the electromagnetic force generated is inefficient in its application for power utilization to drive the mechanical component. Usually, a substantial amount of energy is required which either makes the device inefficient or extremely costly in terms of energy conversion. In most situations, as the electromagnetic force is generated, the lines of flux fail to adequately attract or repel the mechanical portion of the device so that only a limited movement of the mechanical portion is produced. In a very short time, frictional forces take over and the mechanical portion ceases to produce mechanical energy. Also, a major problem in prior motors which take electrical energy and convert to mechanical energy resides in encountering a load factor which causes the mechanical output to run or turn over at a slower and slower pace until it finally stops. In order to maintain a usable output when the mechanical device is under substantial load, additional energy of an electrical nature is needed to be supplied to the device by introducing a sequence of pulsed energy or the like at timed intervals.

Therefore, a long-standing need has existed to provide a novel electromagnetic converter which will convert electrical energy into mechanical output that is useful for work purposes under load and which is of simple construction and that may be used by unskilled persons without technical knowledge.

SUMMARY OF THE INVENTION

Accordingly, the above problems and difficulties are obviated by the present invention which provides a novel electromagnetic converter comprising a housing having an internal cavity through which a shaft rotates that constitutes a driven output shaft. Bearing means are provided on the housing for rotatably supporting the opposite ends of the shaft and the housing includes a plurality of spaced-apart electromagnets arranged in a radial fashion and in concentric relationship with the driven output shaft. A weight of ferrous metal is carried on the shaft by means of an elongated arm secured at one end to the shaft and carrying the weight at its opposite and free end so that the weight will rotate past each of the respective electromagnets as the shaft is rotated. The shaft will rotate in response to passage of the weight through the electromagnetic flux generated by the respective electromagnets. By including a timing means operably connected to the respective electromagnets, smoothness and efficiency of shaft rotation is obtained so that as the weight approaches an electromagnet, a pulling force is encountered while in the flux field and yet when the weight is past the electromagnet, a pushing force is encountered due to the flux field. The flux fields are sequenced in energization in order to permit the momentum of the weight to continue its travel as the weight turns along its path of travel. The shaft will turn in response to movement of the weight as it is drawn and pushed by the timed electromagnetic field for each of the respective magnets.

Therefore, it is among the primary objects of the present invention to provide a simple and operable energy converter for translating electrical energy to mechanical movement via electromagnets and a timing means.

Another object of the present invention is to provide a novel electromagnetic converter for turning a movable shaft in response to movement of a ferrous metal weight past a plurality of electromagnets.

Another object of the present invention is to provide an economic and easily maintained electromagnetic converter from which usable work can be obtained from a mechanical output while under load.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
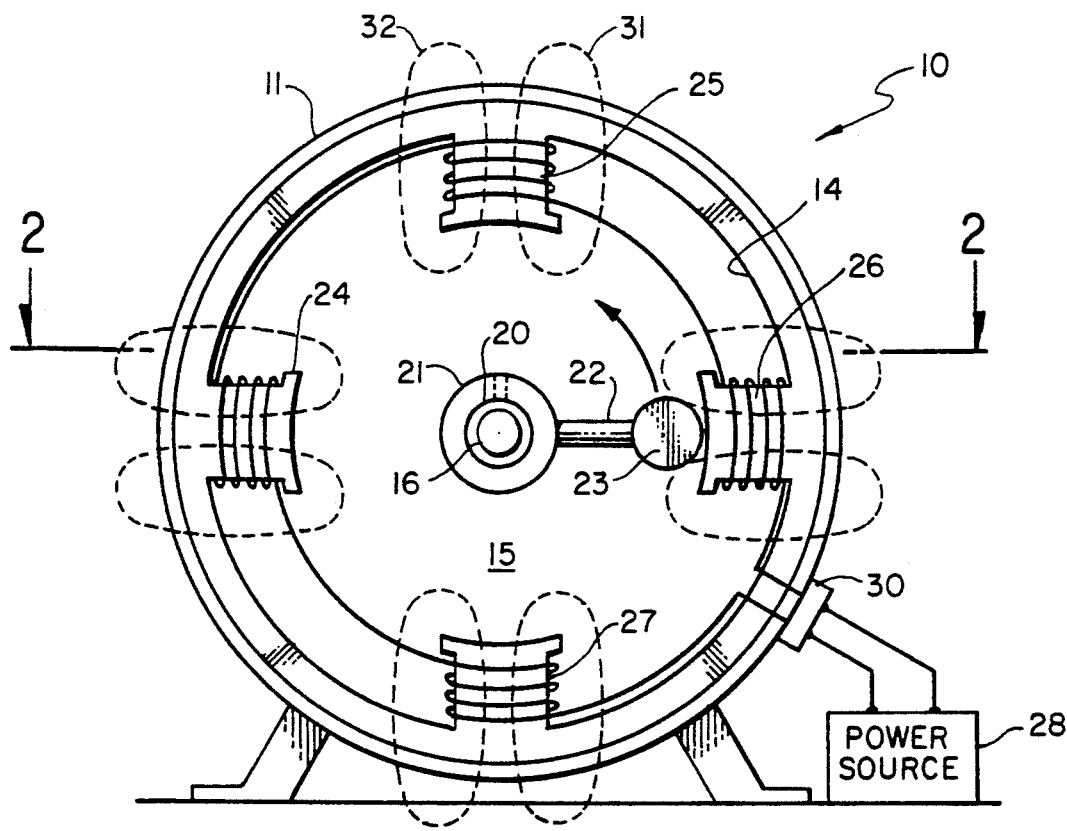
FIG. 1 is a diagrammatic view of an electromagnetic converter employing the inventive concept.

Referring now to FIG. 1, the novel electromagnetic converter of the present invention is illustrated in the general direction of arrow 10 which includes a cylindrical housing 11 having sidewalls 12 and 13 on opposite sides of a circular support broadly identified by numeral 14. The sidewalls 12 and 13, as well as the support ring 14, define a closed interior cavity 15 through which a driven output shaft 16 rotates. The opposite ends of the shaft 16 are rotatably carried in bearings 17 and 18 so that turning friction is maintained at a minimum. A portion of the drive shaft, broadly indicated by numeral 20, outwardly extends from the housing for attachment of collars, gears or other mechanical movement translating devices. The rotating or turning ability of the shaft 16 about a turning axis is indicated by the arrow and preferably, the housing is concentric and coaxial with respect to the driven output shaft 16.

Figure 2:
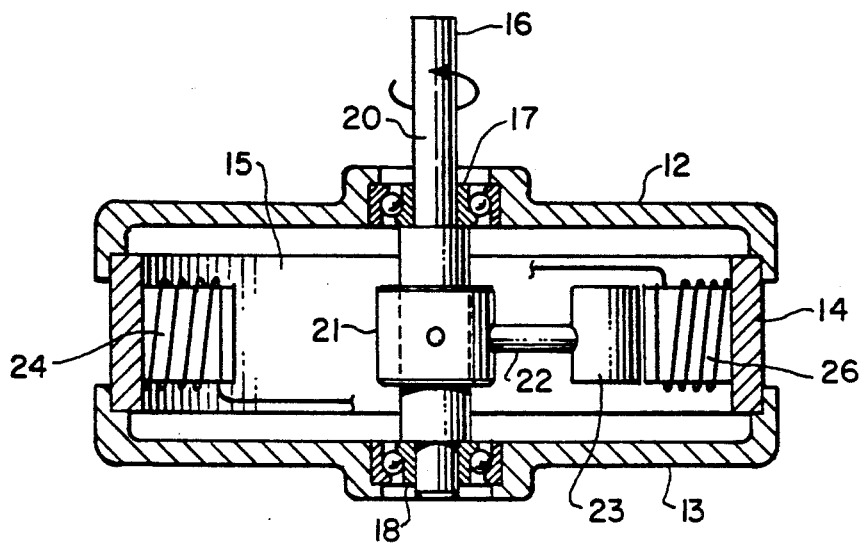
FIG. 2 is a transverse cross-sectional view of the converter shown in FIG. 1 as taken in the direction of arrows 2—2 thereof.

FIGS. 1 and 2 also illustrate that the shaft 16 mounts a hub 21 attached to one end of an arm 22 which outwardly projects through the cavity towards the inner surface of the support ring 14. The free end of the arm 21 carries a weight, such as a metal ball composed of ferrious metal, and indicated by numeral 23. Obviously, as the shaft 16 turns about its turning axis, the weight 23 will follow a circular path that is coaxial with the turning axis.

FIGS. 1 and 2 also disclose that the support ring 14 supports a plurality of electromagnetic magnets and in the present instance, four such electromagnets are illustrated and are represented by numerals 24, 25, 26 and 27 respectively. In order to establish an electromagnetic force about the electromagnets, each of the magnets is coiled with wire in a series relationship and the opposite ends of the wire terminate in a power source 28 via a timer or distributor 30 which may take the form of a microchip processor. The respective flux fields generated by electricity passing through the coiled wires at the electromagnets are represented by the numerals 31 and 32 with respect to electromagnet 25. Therefore, it can be seen that as the weight 23 approaches electromagnet 25, the force field 31 of the flux pattern will draw or attract the weight 23 in a counterclockwise direction. Once the weight 23 has been carried past the center line of the magnet, momentum will carry the weight into the force field 32 which will then operate to push the weight away from electromagnet 25. This relationship continues as the weight progresses along its circular path from one electromagnet to another. The distributor 30 functions to selectively reduce or cut the magnetic field force at critical times so that in no event will the weight 23 be in a force field that will not push or pull in a counterclockwise direction. Without such a distributor, the weight may encounter a contra electromagnetic force field which would cause it to stop or greatly retard its movement.

In view of the foregoing, it can be seen that the inventive concept of the present invention includes the conversion or translation of electrical energy from the power source 28 into mechanical movement and output by means of the rotatable shaft 16. The arm and weight serve as a type of pendulum which moves in a turning path about the turning axis of the shaft 16 and the electromagnetic fields generated by the respective electromagnets push and pull the weight 23 along its circular path.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An eccentric-rotor energy converter for translating electrical energy into a mechanical output comprising:

a housing having a closed internal cavity;

a plurality of electromagnets mounted on said housing within said cavity in fixed spaced-apart relationship in opposition to each other;

an output shaft having opposite ends rotatably carried on said housing between said electromagnets equally spaced therefrom and extending said housing cavity equidistance from said electromagnets;

a weight composed of ferrous material laterally carried on said shaft effective to eccentrically rotate said shaft;

power means including a sequence timer for selectively energizing said plurality of electromagnets in a predetermined sequence to alternately push and pull said weight from one electromagnet to the next electromagnet in an eccentric manner whereby said shaft rotates about its turning axis;

said housing is circular in cross-section and said weight revolves in a circular path of travel within said cavity to drive said shaft;

an elongated arm secured at one end to said shaft and said weight secured at the other end of said arm;

said power source timer is a microchip processor external of said housing and operably coupled to said electromagnets;

bearing means carried on said housing rotatably supporting said opposite ends of said output shaft;

said weight circular path is coaxial with said output shaft; and said output shaft having a critical portion projecting exteriorly of said housing providing for mechanical shaft output to complete conversion and translation of electrical energy into mechanical output.

* * * * *